Feb. 26, 1935.  A. H. HARRISON  1,992,208
AERATION OF SLURRIES
Filed Sept. 21, 1933

INVENTOR:
ARTHUR HUGO HARRISON

BY *Alex. E. MacRae*
ATTORNEY.

Patented Feb. 26, 1935

1,992,208

UNITED STATES PATENT OFFICE 1,992,208

AERATION OF SLURRIES

Arthur Hugo Harrison, Gold Pines, Ontario, Canada

Application September 21, 1933, Serial No. 690,340

4 Claims. (Cl. 83—73)

This invention relates to the aeration of slurries in the production of porous building materials. It is applicable to cementitious materials, which have the inherent capacity to set and harden upon hydration, and equally well to materials, which have not in themselves this setting capacity but which require some further processing step to bind the aerated mass into permanent form, such, for example, as lime and clay, which may be hardened by carbonation and burning respectively.

In my application for patent, No. 620,845, I have disclosed a method of aerating slurries and the present invention is a further improvement thereon.

The invention will be described with reference to the accompanying drawing, in which—

Figure 2:
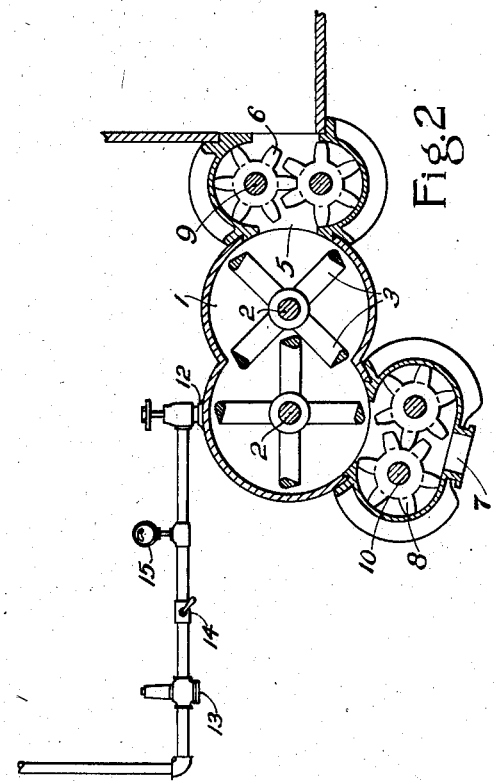
Figure 1:
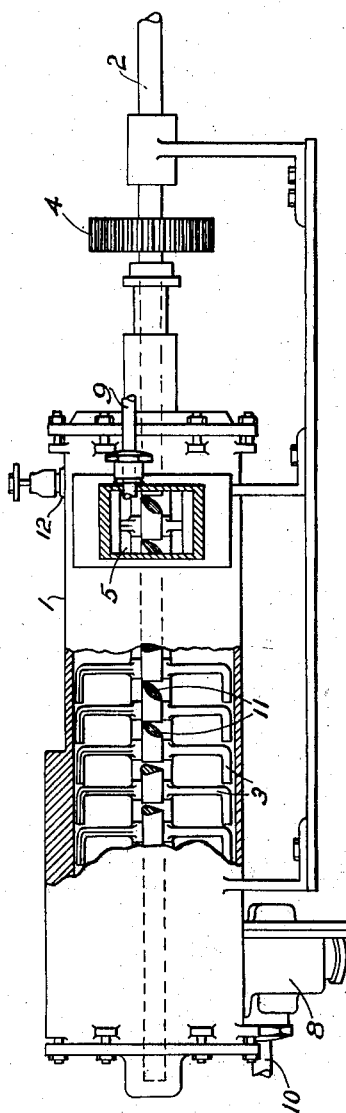
Figure 1:
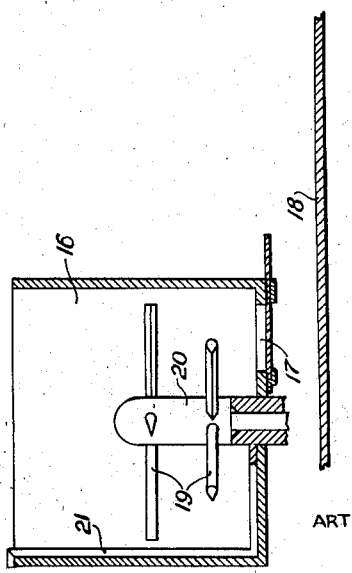

Figure 1 is a side elevation, partly in section, of a suitable apparatus for aerating slurries in accordance with the invention, and Figure 2 is a cross sectional view of a portion of the apparatus.

In the drawing, 1 represent a chamber providing the closed space within which the aeration of the slurry is effected. Rotatable shafts 2 carry a plurality of agitator blades 3, the ends of which are bent at right angles along the wall of the chamber to provide scrapers for keeping the walls clean and free from accumulations of material which, in some cases, might have a tendency to set and harden thereon. The agitator blades have a stream-line contour to prevent accumulations thereon. The shafts 2 are mounted in any suitable bearings. A gear wheel 4 on the driven shaft meshes with a similar gear on the other shaft and is driven at the desired rate by any suitable means, not shown. Slurry is fed into one end of the chamber through the inlet 5 by means of a pressure-sustaining pump 6 and is discharged therefrom by a similar pump 8 and outlet 7. The pumps 6 and 8 are actuated by means of the shafts 9 and 10, respectively, which may be driven by any suitable means, not shown. Impellers 11, tending to accelerate the travel of the slurry in the chamber, may be provided on the agitator blades adjacent the feed end, middle and discharge end of the chamber or all blades may be so equipped.

Air under pressure is admitted at 12. A pressure reducing valve 13 is provided for maintaining a predetermined constant pressure within the chamber, as well as a cock 14 and a pressure gauge 15.

The outlet 7 preferably discharges into an open agitating or bubble-slicing chamber 16 having a discharge outlet 17 leading to a conveyor belt 18 or the like for carrying the aerated slurry to the point of further processing. Within the chamber 16 a plurality of bubble-slicing blades 19 are arranged for rotation upon a shaft 20 and a wall-cleaning device or scraper 21 is similarly arranged. The blades 19 have a stream-line contour as illustrated to provide for self-cleaning thereof.

In operation a slurry, comprising a mixture of water and cement, plaster of Paris, lime, clay or the like, and containing any suitable bubble-forming agent, is fed into the chamber 1 by means of the pump 6 and air at a desired pressure, which may vary from atmospheric up, is admitted at 12. Air in excess of that to be incorporated in the slurry is maintained in the aerating chamber and the pressure within the chamber is maintained constant while producing a cellular product of a given weight. The extent of this pressure determines the weight of the aerated product. Rotation of the blades 3 incorporates the air in the slurry, where it is retained by the bubble-forming agent. The period of agitation and the rate at which the shafts 2 travel will influence the amount of air incorporated in the slurry but in practice these factors are preferably fixed at the most convenient point and the extent of aeration is governed by the pressure maintained on the predetermined volume of air in the chamber. Increase in pressure increases the amount of air occluded in the slurry and when the aerated slurry is discharged through the pump 8 the mass expands with freedom from super-atmospheric pressure.

Substantial pressures are frequently employed and in accordance with the invention the aerated slurry is discharged into the bubble-slicing chamber 16 and further agitated, under atmospheric pressure, to subdivide the expanded bubbles into smaller units in order to avoid loss of air, with the consequent increase in weight, and, at the same time, to uniformly distribute the bubbles of substantially uniform and smaller size within the mass. The level of the slurry in the chamber 16 is always maintained substantially above the top slicing blade 19 in order to avoid the introduction of additional air from the atmosphere to which the surface of the mass is exposed. It will be appreciated that when the aerated mass is liberated from a pressure of, say, 80 or 90 pounds per square inch, the cells may expand so substantially that some of the cells break, allowing air to escape and leaving the mass unevenly aerated, while the cells may be unduly large for some uses to which the aerated slurry is put.

The re-agitation of the slurry under normal atmospheric pressure, as described overcomes these difficulties and maintains the desired density characteristics produced by the pressure aeration.

The process may be continuous in operation or it may be operated intermittently on batches of slurry. In the latter case the aerated slurry may be reagitated in the chamber 1 after releasing the pressure therein.

Bubble-forming agents of the character herein used are well known and many are available. As illustrative may be mentioned rosin soap, glue and saponin which may be used alone or in combination.

I claim:

1. A method of aerating slurry which comprises agitating a slurry containing a bubble-forming agent in the presence of a predetermined volume of air maintained under a constant pressure in excess of atmospheric to incorporate air in the slurry, reducing the pressure to that of the atmosphere and re-agitating the expanded cellular mass.

2. In the production of cellular building materials, the continuous method of aerating a slurry containing a bubble-forming agent, which comprises continuously feeding the slurry into a chamber in which is maintained a predetermined volume of air under super-atmospheric pressure, agitating the slurry to incorporate air therein, reducing the pressure on the aerated slurry and re-agitating the expanded mass to subdivide the cells therein.

3. Apparatus for aerating slurry which comprises an aerating chamber, means for maintaining a predetermined volume of air in said chamber under super-atmospheric pressure, means for continuously feeding slurry to said chamber adapted to maintain said super-atmospheric pressure therein, similar means for continuously discharging the aerated slurry from said chamber and means in said chamber for incorporating air in the slurry.

4. Apparatus as defined in claim 3 having in combination with said discharge means a bubble-slicing chamber for re-agitating the aerated slurry under atmospheric pressure.

ARTHUR HUGO HARRISON.